US006799144B2

United States Patent
Li et al.

(10) Patent No.: US 6,799,144 B2
(45) Date of Patent: *Sep. 28, 2004

(54) METHOD AND APPARATUS FOR ANALYZING MEASUREMENTS

(75) Inventors: Peng Li, Fremont, CA (US); Ross Adam Jessen, Savage, MN (US); Jan Brian Wilstrup, Mounds View, MN (US); Dennis Petrich, San Jose, CA (US)

(73) Assignee: Wavecrest Corporation, Eden Prairie, MN (US)

(*) Notice: Subject to any disclaimer, the term of this patent is extended or adjusted under 35 U.S.C. 154(b) by 127 days.

This patent is subject to a terminal disclaimer.

(21) Appl. No.: 09/894,244

(22) Filed: Jun. 27, 2001

(65) Prior Publication Data

US 2001/0044704 A1 Nov. 22, 2001

Related U.S. Application Data

(63) Continuation of application No. 09/210,269, filed on Dec. 11, 1998, now Pat. No. 6,298,315.

(51) Int. Cl.$^7$ .............................................. G06F 101/14
(52) U.S. Cl. ........................................ 702/180; 375/371
(58) Field of Search ................................ 702/179–183, 702/128, 69; 700/51, 52, 93; 375/130, 226, 355, 356, 371

(56) References Cited

U.S. PATENT DOCUMENTS

| | | | | |
|---|---|---|---|---|
| 4,676,641 A | * | 6/1987 | Bott ........................... | 356/336 |
| 4,831,637 A | * | 5/1989 | Lawrence et al. .......... | 375/371 |
| 4,908,784 A | * | 3/1990 | Box et al. ................... | 702/176 |
| 5,068,788 A | * | 11/1991 | Goodenough et al. ...... | 382/131 |
| 5,349,612 A | * | 9/1994 | Guo et al. .................. | 375/371 |
| 5,367,542 A | * | 11/1994 | Guo ........................... | 375/359 |
| 5,452,333 A | * | 9/1995 | Guo et al. .................. | 375/371 |
| 5,899,959 A | * | 5/1999 | Shields et al. ............. | 702/35 |
| 6,298,315 B1 | * | 10/2001 | Li et al. ..................... | 702/180 |

* cited by examiner

Primary Examiner—Marc S. Hoff
Assistant Examiner—Craig Steven Miller
(74) Attorney, Agent, or Firm—Merchant & Gould P.C.

(57) ABSTRACT

A method, apparatus, and article of manufacture for analyzing measurements. The invention provides a method for separating and analyzing the components of a distribution, such as deterministic and random components. The method performs the steps of collecting data from a measurement apparatus, constructing a histogram based on the data such that the histogram defines a distribution, fitting tails regions wherein deterministic and random components and associated statistical confidence levels are estimated.

74 Claims, 3 Drawing Sheets

METHOD AND APPARATUS FOR ANALYZING MEASUREMENTS

This application is a continuation of application Ser. No. 09/210,269, filed Dec. 11, 1998, which now U.S. Pat. No. 6,298,315 application is incorporated herein by reference.

BACKGROUND OF THE INVENTION

1. Field of the Invention

This invention relates in general to measurement apparatus; more particularly, to a system and method for analyzing components of a distribution; and more particularly still, to a system and method for analyzing deterministic and random components of signals.

2. Description of Related Art

A commonly encountered problem in processing measurements is to accurately determine the physical processes and key parameters associated with the distribution. In many cases, a distribution may have both deterministic and random components associated with it. It is essential to extract important information on what kind of physical processes are involved in the distribution and how much each process contributes to the measured distribution.

The present available statistical tools do not allow separation of deterministic and random components. Instead such tools determine a mean and sigmna for the entire distribution. The present invention provides a solution to this and other problems, and offers other advantages.

SUMMARY OF THE INVENTION

The present invention discloses a method, apparatus, and article of manufacture for analyzing measurements. The invention provides a method for separating and analyzing the components of a distribution, such as deterministic and random components. The method performs the steps of collecting data from a measurement apparatus, constructing a histogram based on the data such that the histogram defines a distribution, fitting tail regions of the distribution, and calculating the deterministic and random components of the distribution. The tail regions are defined by calculating the first and second order derivative of the histogram. The tail regions are fitted to predefined models and the fitted parameters are determined. The statistical confidence of the fitted parameters is estimated. Although this method may be applied to any distribution, it works particularly well to analyze signal distributions such as jitter signal distributions. The deterministic and random components of jitter can have many uses, including: 1) determining the operation margin for a digital system; 2) calculating and predicting the error probability for a digital system; 3) providing diagnostics for digital system characterization and debug; and 4) providing pass/fail values to production tests.

BRIEF DESCRIPTION OF THE DRAWINGS

Referring now to the drawings in which like reference numbers represent corresponding parts throughout.

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Figure 1:
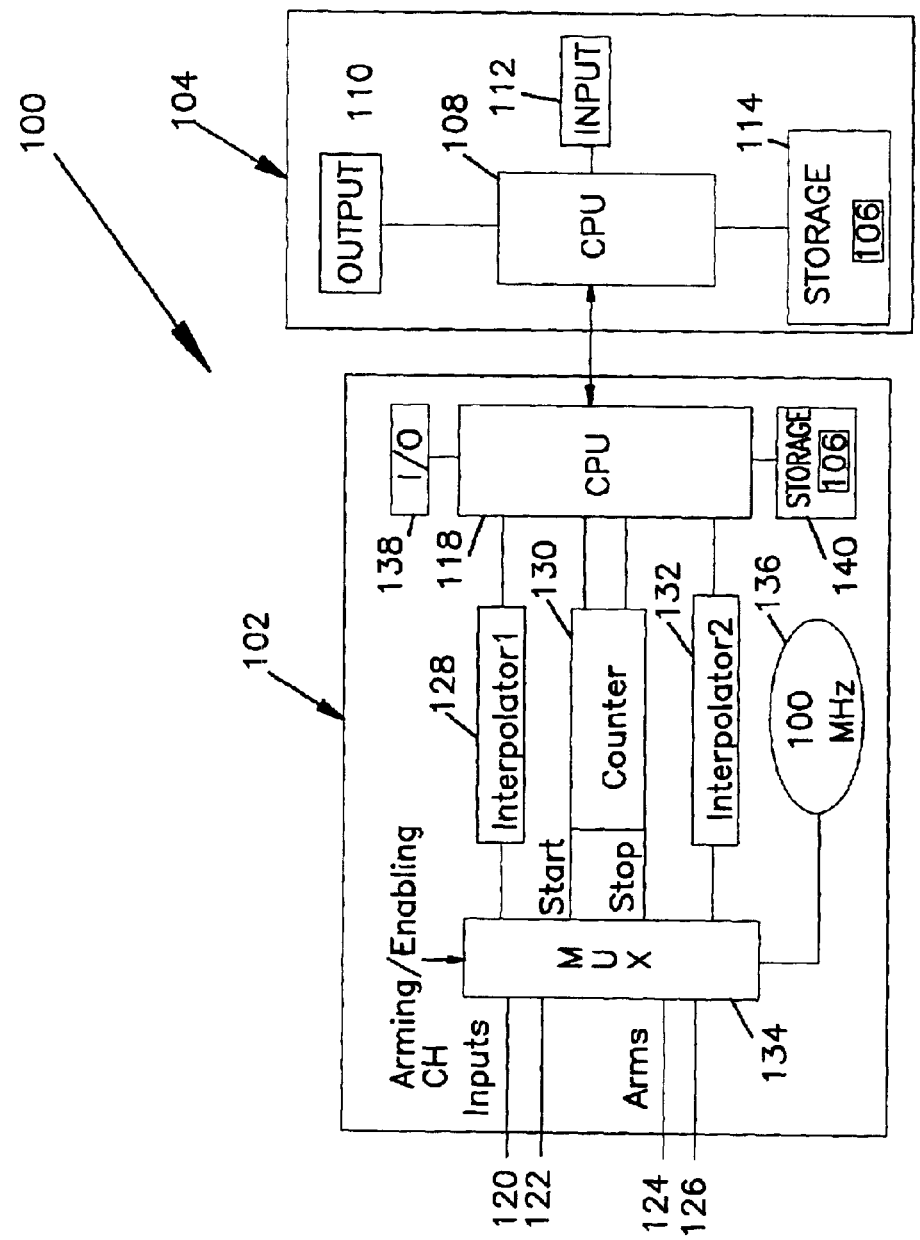
FIG. 1 is an exemplary illustration of a representative hardware environment for a signal analyzing system according to an embodiment of the present invention.

FIG. 1 is an exemplary illustration of a representative hardware environment for a signal analyzing system 100 according an embodiment of the present invention. A typical configuration may include a measurement apparatus 102 that measures the time interval between two events (start and stop) through counters. A measurement apparatus is disclosed in U.S. Pat. No. 4,908,784, which is hereby incorporated by reference. A typical measurement apparatus is the Wavecrest DTS-2075, available from Wavecrest Corporation, Edina, Minn.

Those skilled in the art will recognize that other systems that enable signal/distribution analysis that are based on real world measurement (i.e., measurements that are non-ideal or subject to uncertainty) would be applicable. Generally, this would include any product that can act as a distribution source. These devices include an oscilloscope, Automated Test Equipment (ATE), spectrum analyzer, network analyzer, TIA (time interval analyzer), universal time frequency counter, and modulation domain analyzer. Other devices may include a CCD, an x-ray camera, a MRI, and an ultrasound.

The measurement apparatus 102 interfaces to a workstation 104 and operates under the control of an analysis program 106 resident on the workstation 104. The analysis program 106 is typically implemented through data analysis software. One commercially available analysis software is the Wavecrest Virtual Instrument (VI) software, available from Wavecrest Corporation, Edina, Minn. Other analysis software includes LABVIEW, MathCad, MATLAB, Mathematica, among others. The workstation 104 comprises a processor 108 and a memory including random access memory (RAM), read only memory (ROM), and/or other components. The workstation 104 operates under control of an operating system, such as the UNIX® or the Microsoft® Windows NT operating system, stored in the memory to present data to the user on the output device 110 and to accept and process commands from the user via input device 112, such as a keyboard or mouse.

The analysis program 106 of the present invention is preferably implemented using one or more computer programs or applications executed by the workstation 104. Those skilled in the art will recognize that the functionality of the workstation 104 may be implemented in alternate hardware arrangements, including a configuration where the measurement apparatus 102 includes CPU 118, memory 140, and I/O 138 capable of implementing some or all of the steps performed by the analysis program 106. Generally, the operating system and the computer programs implementing the present invention are tangibly embodied in a computer-readable medium, e.g. one or more data storage devices 114, such as a zip drive, floppy disc drive, hard drive, CD-ROM drive, firmware, or tape drive. However, such programs may also reside on a remote server, personal computer, or other computer device.

The analysis program 106 provides for different measurement/analysis options and measurement sequences. The analysis program 106 interacts with the measurement apparatus 102 through the on-board CPU 118. In one embodiment, the measurement apparatus 102 provides arming/enabling functionality such that the apparatus 102 can measure a signal either synchronously or asynchronously. The signal is fed to the channel input arming/enabling controls 120, 122, 124, and 126 to which event that a measurement is made. Counter/interpolators 128, 130, and 132 measure the time elapse between the start and stop events. Interpolators provide fine time resolution down to 0.8 ps. In response to input controls 120, 122, 124, and 126, multiplexer 134 controls the counter/interpolators 128, 130, and 132 based on a clock 136 signal. Clock 136 is typically a precise crystal oscillator.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Figure 2:
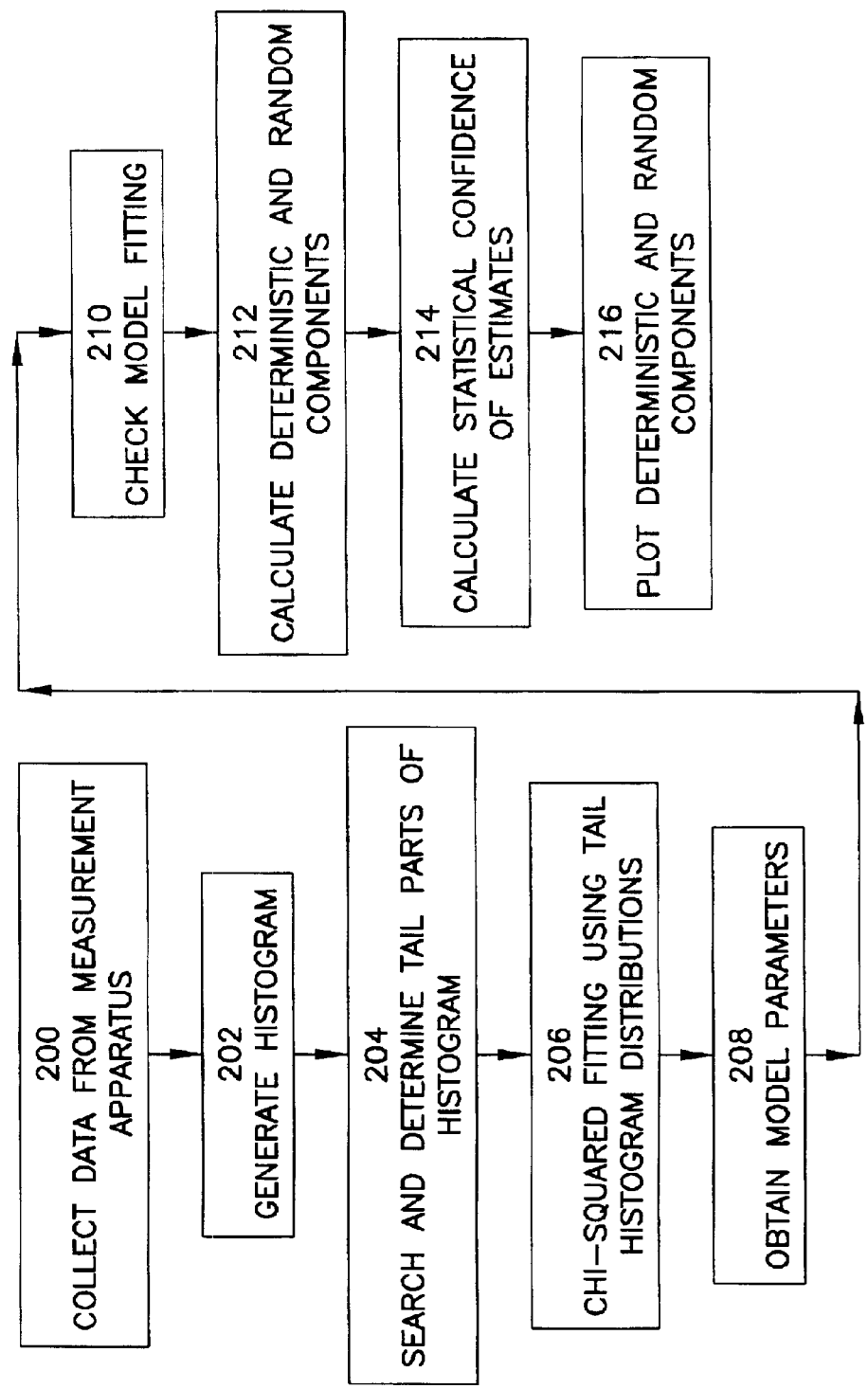
FIG. 2 is a flow diagram illustrating the steps performed by the analysis program according to an embodiment of the present invention.

FIG. 2 is a flow diagram illustrating the steps performed by the analysis program 106 according to one embodiment of the present invention. The present invention is directed towards analyzing the deterministic and random components of a distribution. In one embodiment of the present invention, the analysis program 106 analyzes the jitter of a signal. Jitter in serial data communication is a difference of data transition times relative to ideal bit clock active transition times. Jitter in digital systems is the difference between an ideal clock period and an actual clock period. As in all signals, jitter has deterministic and random components. Deterministic jitter is bounded in its amplitude and can be measured peak to peak. Random jitter is unbounded in its amplitude and Gaussian in nature. Since random jitter is probabalistic, it must be quantified by one sigma of standard deviation estimate. Random jitter is modeled by a Gaussian distribution. The distribution may be the superposition of multiple Gaussian functions. The analysis program separates the deterministic and random components of the jitter.

Block 200 represents the analysis program 106 collecting data from the measurement apparatus 102. The data may be physically based or model based.

Block 202 represents the analysis program 106 generating a jitter histogram by calculating the local statistics in each time bin. A histogram is a statistical representation of the distribution of measured physical parameters. The bin size may be fixed or variable for a given distribution. Mathematically, a histogram indicates how the number of measurements change over the measured parameters. The general procedure for generating a histogram is: 1) measurement apparatus 102 measures a signal parameter (for example, period, frequency, duty cycle, etc.) repeatedly to obtain a statistical sample; 2) analysis program 106 sorts the data in a descending (ascending) order; 3) analysis program 106 automatically defines bin sizes, and the total number of measurements that fall into bin ranges is then accumulated; 4) A data set of the number of measurements versus the various measured parameters, namely histogram, is then composed and plotted graphically. Although the present embodiment describes a histogram, the present invention may apply to any kind of distribution. For example, amplitude versus time (waveform), amplitude versus frequency (spectrum), time versus time (jitter time function), time versus frequency (jitter spectrum).

Figure 3:
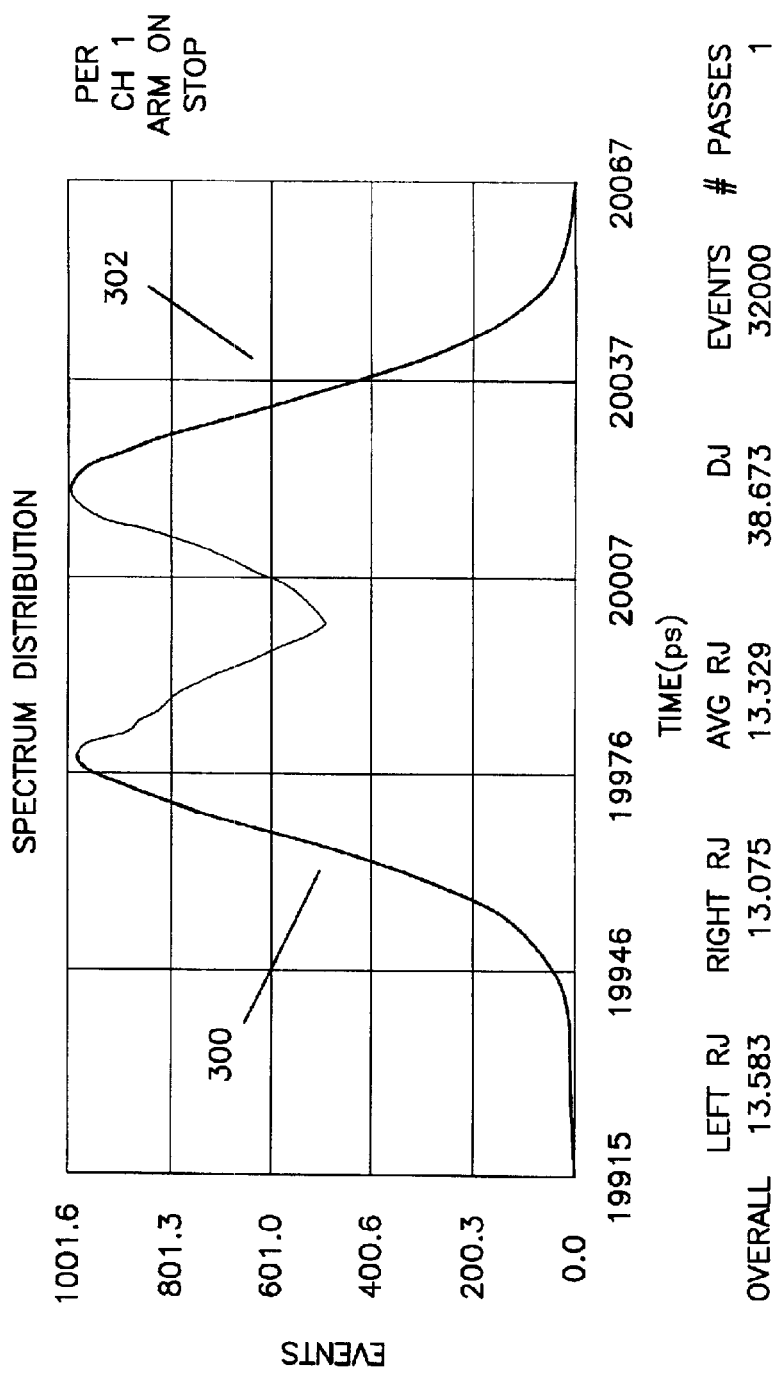
FIG. 3 is a chart illustrating a typical display screen according to an embodiment of the present invention.

Block 204 represents the analysis program 106 searching and determining the is tail parts of the histogram by the first and second order derivative method. The tailparts may be found in any isolated area of the distribution. In the exemplary embodiment, the tailpart distributions start from the edge of the far left (or right) of the histogram to the first maximum, as is shown in FIG. 3.

Block 206 represents the analysis program 106 starting the $\chi^2$ (chi-squared) method for fitting the tails of the histogram distributions $\chi^2$ is defined as:

$$\chi^2 = \sum_{i=1}^{n} \left( \frac{y_{mod} - y_i}{\Delta y_i} \right)^2 \quad (1)$$

where ymod is the model expected value as defined as:

$$y_{mod} = y_{max} e^{-\left(\frac{x-\mu}{\sqrt{2}\sigma}\right)^2} \quad (2)$$

Where $y_{max}$ is the maximum value, $\mu$ is the mean, and $\sigma$ is the standard deviation, for a Gaussian distribution model. They are the fitting parameters. xi and yi are pairs of data which composite a distribution. (In the case of the histogram, xi is the measured parameter, yi is the accumulated events corresponding to xi). $\Delta$yi is the error of yi data. The best fitting parameters will be obtained by minimizing the $\chi^2$. ymod can be any arbitrary function. $\chi^2$ is provides accurate model parameter deduction using measurements which are subject to errors and statistical fluctuation.

Block 208 represents the analysis program 106 obtaining the Gaussian distribution parameters. The parameters $\mu$ and $\sigma$ are obtained for the first (left) and second (right) tails of the distribution.

Block 210 represents the analysis program 106 doing a statistical check of the Gaussian fitting to determine the applicability of the model or the adequacy of the measurements.

Block 212 represents the analysis program 106 calculating the deterministic jitter (DJ) and random jitter (RJ) based on the following formulas: DJ=$\mu 2-\mu 1$ and RJ=($\sigma 1+\sigma 2$)/2.

Block 214 represents the analysis program 106 calculating the statistical confidence of the DJ and RJ estimates. Methods to calculate a normalized chi squared error are well known in the art.

In the jitter example, the distribution may be multiple Gaussian. In that case, the method may be revised to account for superposition of multiple distributions.

Block 216 represents the analysis program 106 displaying a plot of the RJ and DJ on output 110. When the DJ and RJ are obtained, the total jitter (TJ=DJ+RJ) is ready to calculate.

Another example of the method and apparatus according to this invention is spectral analysis. The analysis program 106 may determine noise processes using spectral distribution data. Important parameters, such as power index and exponential growth rate can be deduced. The Gaussian model applied to the jitter analysis is replaced by power-law and exponentials which are more appropriate for noise processes.

Generally, the distribution fitting analysis performed by the analysis program 106 may be applied to any model. The jitter embodiment described above applies tail fitting to a Gaussian distribution which is appropriate for determining the deterministic and random components of jitter.

It will be appreciated that FIG. 2 represents a methodology, routine, and/or logical flow of program steps which may be implemented to perform the method of the present invention. Other programming steps may be included and such specific logical flow is intended by way of illustration of a preferred routine.

FIG. 3 is a chart illustrating a typical display screen according to an embodiment of the present invention. After analyzing a signal received from the measurement apparatus 102, the analysis program 106 may provide a chart showing the first (left) tail 300 and second (right) tail (302) of a fitted Gaussian distribution.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of analyzing a clock or communication signal comprised of transitions intended to occur at ideal points in time, but which in fact occur at non-ideal points in time, the method comprising:

receiving the signal;

timing a plurality of the transitions within the received signal;

constructing a histogram based upon the plurality of timed transitions; and fitting a model distribution to a tail region of the histogram, the fitted model distribution providing information regarding deterministic and random jitter components within the signal.

2. The method of claim 1, wherein the fitting step comprises the steps of:

(a) finding a first and a second tail region of the histogram representing actual timing of the transitions;

(b) fitting the first and second tail regions to a predefined first model distribution and second model distribution, respectively; and (c) estimating fitted parameters of the first model distribution and the second model distribution.

3. The method of claim 2, wherein the finding step comprises the step of finding the first and second tail region based on a first derivative and second derivative method.

4. The method of claim 2, the model parameters comprise mean ($\mu$) and standard deviation ($\sigma$).

5. The method of claim 4, (wherein the deterministic component is calculated according the following formula: $\mu 1 - \mu 2$, $\mu 1$ representing the mean of the first model distribution, and $\mu 2$ representing the mean of the second model distribution.

6. The method of claim 4, wherein the random component is calculated according the following formula $(\sigma 1 + \sigma 2)2$, $\sigma 1$, representing the standard deviation of the first model distribution, and $\sigma 2$ representing the standard deviation of the second model distribution.

7. An apparatus for analyzing a clock or communication signal comprised of transitions intended to occur at ideal points in time, but which in fact occur at non-ideal points in time, the apparatus comprising:

a measurement apparatus for timing a plurality of the transitions within the received signal; and an analyzing unit for constructing a histogram based upon the plutality of timed transitions; and fitting a model distribution to a tail region of the histogram, the fitted model distribution providing information regarding deterministic and random jitter components within the signal.

8. The apparatus of claim 7, wherein the analyzing unit performs the following steps:

(a) finding a first and a second tail region of the histogram representing actual timing of the transitions;

(b) fitting the first and second tail regions to a predefined first model distribution and second model distribution, respectively; and (c) estimating fitted parameters of the first model distribution and the second model distribution.

9. The apparatus of claim 8, wherein the finding step comprises the step of finding the first and second tail region based on a first derivative and second derivative method.

10. The apparatus of claim 8, wherein the model parameters comprise mean ($\mu$) and standard deviation ($\sigma$).

11. The apparatus of claim 10, wherein the deterministic component is calculated according the following fornuila: $\mu 1 - \mu 2$, $\mu 1$ representing the mean of the first model distribution, and $\mu 2$ representing the mean of the second model distribution.

12. The apparatus of claim 10, wherein the random component is calculated according the following formula $(\sigma 1 + \sigma 2)/2$, $\mu 1$ representing the standard deviation of the first model distribution, and $\sigma 2$ representing the standard deviation of the second model distribution.

13. A method of analyzing a clock or communication signal comprised of signals components intended to have an ideal amplitude, but which in tact have a non-ideal amplitude, the method comprising:

receiving the signal;

measuring the actual amplitude of the signal components of the received signal;

constructing a histogram based upon the plurality of measured amplitudes; and fitting a model distribution to a tail region of the histogram, the fitted model distribution providing information regarding deterministic and random noise components of the signal.

14. The method of claim 13, wherein the fitting step comprises the steps of: (a) finding a first and a second tail region of the histogram representing actual amplitudes of the signal components;

(b) fitting the first and second tail regions to a predefined first model distribution and second model distribution, respectively, and (c) estimating fitted parameters of the first model distribution and the second model distribution.

15. The method of claim 14, wherein the finding step comprises the step of finding the first and second tail region based on a first derivative and second derivative method.

16. The method of claim 14, wherein the model parameters comprise mean ($\mu$) and standard deviation ($\sigma$).

17. The method of claim 16, wherein the deterministic component is calculated according the following formula: $\mu 1 - \mu 2$, $\mu 1$ representing the mean of the first model distribution, and $\mu 2$ representing the mean of the second model distribution.

18. The method of claim 16, wherein the random component is calculated according the following formula $(\sigma 1 + \sigma 2)/2$, $\sigma 1$ representing the standard deviation of the first model distribution, and $\sigma 2$ representing the standard deviation of the second model distribution.

19. An apparatus for analyzing a clock or communication signal comprised of signals components intended to have an ideal amplitude, but which in fact have a non-ideal amplitude, the apparatus comprising:

a measurement apparatus for measuring the actual amplitude of the signal components of the received signal; and an analyzing unit for
constructing a histogram based upon the plurality of measured amplitudes; and
fitting a model distribution to a tail region of the histogram, the fitted model distribution providing information regarding deterministic and random noise components of the signal.

20. The apparatus of claim 19, wherein the analyzing unit performs the following steps:
   (a) finding a first and a second tail region of the histogram;
   (b) fitting the first and second tail regions to a predefined first model distribution and second model distribution, respectively; and
   (c) estimating fitted parameters of the first model distribution and the second model distribution.

21. The apparatus of claim 20, wherein the finding step comprises the step of finding the first and second tail region based on a first derivative and second derivative method.

22. The apparatus of claim 20, wherein the model parameters comprise mean ($\mu$) and standard deviation ($\sigma$).

23. The apparatus of claim 22, wherein the deterministic component is calculated according the following formula: $\mu 1 - \mu 2$, $\mu 1$ representing the mean of the first model distribution, and $\mu 2$ representing the mean of the second model distribution.

24. The apparatus of claim 22, wherein the random component is calculated according the following formula $(\sigma 1 + \sigma 2)/2$, $\sigma 1$ representing the standard deviation of the first model distribution, and $\sigma 2$ representing the standard deviation of the second model distribution.

25. A method of analyzing a clock or commumcation signal comprised of waveforms intended to have an ideal phase, but which in fact have a non-ideal phase, the method comprising:
   receiving the signal;
   measuring the actual phase of the waveforms of the received signal;
   constructing a histogram based upon the measured phases; and
   fitting a model distribution to a tail region of the histogram, the fitted model distribution providing information regarding deterministic and random phase jitter components of the signal.

26. The method of claim 25, wherein the fitting step comprises the steps of:
   (a) finding a first and a second tail region of the histogram representing actual phases of the waveforms;
   (b) fitting the first and second tail regions to a predefined first model distribution and second model distribution, respectively; and
   (c) estimating fitted parameters of the first model distribution and the second model distribution.

27. The method of claim 26, wherein the finding step comprises the step of finding the first and second tail region based on a first derivative and second derivative method.

28. The method of claim 26, wherein the model parameters comprise mean ($\mu$) and standard deviation ($\sigma$).

29. The method of claim 28, wherein the deterministic component is calculated according the following formula: $\mu 1 - \mu 2$, $\mu 1$ representing the mean of the first model distribution, and $\mu 2$ representing the mean of the second model distribution.

30. The method of claim 28, wherein the random component is calculated according the following formula $(\sigma 1 + \sigma 2)/2$, $\sigma 1$ representing the standard deviation of the first model distribution, and $\sigma 2$ representing the standard deviation of the second model distribution.

31. An apparatus for analyzing a clock or communication signal comprised of waveforms intended to have an ideal phase, but which in fact have a non-ideal phase, the apparatus comprising:
   a measurement apparatus for measuring the actual phase of the waveforms of the received signal; and
   an analyzing unit for
      constructing a histogram based upon the measured phases; and
      fitting a model distribution to a tail region of the histogram, the fitted model distribution providing information regarding deterministic and random phase jitter components of the signal.

32. The apparatus of claim 31, wherein the analyzing unit performs the following steps:
   (a) finding a first and a second tail region of the histogram;
   (b) fitting the first and second tail regions to a predefined first model distribution and second model distribution, respectively; and
   (c) estimating fitted parameters of the first model distribution and the second model distribution.

33. The apparatus of claim 32, wherein the finding step comprises the step of finding the first and second tail region based on a first derivative and second derivative method.

34. The apparatus of claim 32, wherein the model parameters comprise mean ($\mu$) and standard deviation ($\sigma$).

35. The apparatus of claim 34, wherein the deterministic component is calculated according the following formula; $\mu 1 - \mu 2$, $\mu 1$ representing the mean of the first model distribution, and $\mu 2$ representing the mean of the second model distribution.

36. The apparatus of claim 34, wherein the random component is calculated according the following formula $(\sigma 1 + \sigma 2)/2$, $\sigma 1$ representing the standard deviation of the first model distribution, and $\sigma 2$ representing the standard deviation of the second model distribution.

37. A method of analyzing a clock signal intended to have a particular period, but which in fact has an irregular period, the method comprising:
   receiving the signal;
   timing a plurality of periods within the received signal;
   constructing a histogram based upon the plurality of timed periods; and
   fitting a model distribution to a tail region of the histogram, the fitted model distribution providing information regarding deterministic and random jitter components within the signal.

38. The method of claim wherein the fitting step comprises the steps of:
   (a) finding a first and a second tail region of the histogram representing actual periods within the clock signal;
   (b) fitting the first and second tail regions to a predefined first model distribution and second model distribution, respectively; and
   (c) estimating fitted parameters of the first model distribution and the second model distribution.

39. The method of claim 38, wherein the finding step comprises the step of finding the first and second tail region based on a first derivative and second derivative method.

40. The method of claim 38, wherein the model parameters comprise mean ($\mu$) and standard deviation ($\sigma$).

41. The method of claim 40, wherein the deterministic component is calculated according the following formula:

$\mu 1-\mu 2$, $\mu 1$ representing the mean of the first model distribution, and $\mu 2$ representing the mean of the second model distribution.

42. The method of claim 40, wherein the random component is calculated according the following formula $(\sigma 1+\sigma 2)/2$, $\sigma 1$ representing the standard deviation of the first model distribution, and $\sigma 2$ representing the standard deviation of the second model distribution.

43. An apparatus for analyzing a clock signal intended to have a particular period, but which in fact has an irregular period, the apparatus comprising:
   a measurement apparatus for timing a plurality of periods within the received signal; and an analyzing unit for
      constructing a histogram based upon the plurality of timed periods; and
      fitting a model distribution to a tail region of the histogram the fitted model distribution providing information regarding deterministic and random jitter components within the signal.

44. The apparatus of claim 43, wherein the analyzing unit performs the following steps:
   (a) finding a first and a second tail region of the histogram;
   (b) fitting the first and second tail regions to a predefined first model distribution and second model distribution, respectively; and
   (c) estimating fitted parameters of the first model distribution and the second model distribution.

45. The apparatus of claim 44, wherein the finding step comprises the step of finding the first and second tail region based on a first derivative and second. derivative method.

46. The apparatus of claim 44, wherein the model parameters comprise mean ($\mu$) and standard deviation ($\sigma$).

47. The apparatus of claim 46, wherein the deterministic component is calculated according the following formula: $\mu 1-\mu 2$, $\mu 1$ representing the mean of the first model distribution, and $\mu 2$ representing the mean of the second model distribution.

48. The apparatus of claim 46, wherein the random component is calculated according the following formula $(\sigma 1+\sigma 2)/2$, $\sigma 1$ representing the standard deviation of the first model distribution, and $\sigma 2$ representing the standard deviation of the second model distribution.

49. A method of analyzing a clock signal intended to have a particular frequency, but which in fact has an irregular frequency, the method comprising:
   receiving the signal;
   taking a plurality of frequency measurements of the received signal;
   constructing a histogram based upon the plurality of frequency measurements; and
   fitting a model distribution to a tail region of the histogram, the fitted model distribution providing information regarding deterministic and random jitter components within the signal.

50. The method of claim 49, wherein the fitting step comprises the steps of:
   (a) finding a first and a second tail region of the histogram representing actual frequencies within the clock signal;
   (b) fitting the first and second tail regions to a predefined first model distribution and second model distribution, respectively; and
   (c) estimating fitted parameters of the first model distribution and the second model distribution.

51. The method of claim 50, wherein the finding step comprises the step of finding the first and second tail region based on a first derivative and second derivative method.

52. The method of claim 50, wherein the model parameters comprise mean ($\mu$) and standard deviation ($\sigma$).

53. The method of claim 52, wherein the deterministic component is calculated according the following formula: $\mu 1-\mu 2$, $\mu 1$ representing the mean of the first model distribution, and $\mu 2$ representing the mean of the second model distribution.

54. The method of claim 52, wherein the random component is calculated according the following formula $(\sigma 1+\sigma 2)/2$, $\sigma 1$ representing the standard deviation of the first model distribution, and $\sigma 2$ representing the standard deviation of the second model distribution.

55. An apparatus for analyzing a clock signal intended to have a particular frequency, but which in fact has an irregular frequency, the apparatus comprising:
   a measurement apparatus for taking a plurality of frequency measurements of the received signal; and
   an analyzing unit for
      constructing a histogram based upon the plurality of frequency measurements; and
      fitting a model distribution to a tail region of the histogram, the fitted model distribution providing information regarding deterministic and random jitter components within the signal.

56. The apparatus of claim 55, wherein the analyzing unit performs the following steps:
   (a) finding a first and a second tail region of the histogram;
   (b) fitting the first and second tail regions to a predefined first model distribution and second model distribution, respectively; and
   (c) estimating fitted parameters of the first model distribution and the second model distribution.

57. The apparatus of claim 56, wherein the finding step comprises the step of finding the first and second tail region based on a first derivative and second derivative method.

58. The apparatus of claim 56, wherein the model parameters comprise mean ($\mu$) and standard deviation ($\sigma$).

59. The apparatus of claim 58, wherein the deterministic component is calculated according the following formula: $\mu 1-\mu 2$, $\mu 1$ representing the mean of the first model distribution, and $\mu 2$ representing the mean of the second model distribution.

60. The apparatus of claim 58, wherein the random component is calculated according the following formula $(\sigma 1+\sigma 2)/2$, $\sigma 1$ representing the standard deviation of the first model distribution, and $\sigma 2$ representing the standard deviation of the second model distribution.

61. A method of analyzing a clock or communication signal comprised of waveforms intended to have a particular rise or fall time, but which in fact have a non-ideal rise or fall time, the method comprising:
   receiving the signal;
   timing a plurality of rise or fall times within the received signal;
   constructing a histogram based upon the plurality of timed rise or fall times; and
   fitting a model distribution to a tail region of the histogram, the fitted model distribution providing information regarding deterministic and random jitter components within the signal.

62. The method of claim 61, wherein the fitting step comprises the steps of:
   (a) finding a first and a second tail region of the histogram representing actual rise or fall times of the waveforms;
   (b) fitting the first and second tail regions to a predefined first model distribution and second model distribution, respectively; and (c) estimating fitted parameters of the first model distribution and the second model distribution.

63. The method of claim 62, wherein the finding step comprises the step of finding the first and second tail region based on a first derivative and second derivative method.

64. The method of claim 62, wherein the model-parameters comprise mean ($\mu$) and standard deviation ($\sigma$).

65. The method of claim 64, wherein the deterministic component is calculated according the following formula: $\mu1-\mu2$, $\mu1$ representing the mean of the first model distribution, and $\mu2$ representing the mean of the second model distribution.

66. The method of claim 64, wherein the random component is calculated according the following formula ($\sigma1+\sigma2$)/2, $\sigma1$ representing the standard deviation of the first model distribution, and $\sigma2$ representing the standard deviation of the second model distribution.

67. An apparatus for analyzing a clock or communication signal comprised of waveforms intended to have a particular rise or fall time, but which in fact have a non-ideal rise or fall time, the apparatus comprising:

a measurement apparatus for timing a plurality of rise or fall times within the received signal; and an analyzing unit for
constructing a histogram based upon the plurality of timed rise or fall times; and
fitting a model distribution to a tail region of the histogram, the fitted model distribution providing information regarding deterministic and random jitter components within the signal.

68. The apparatus of claim 67, wherein the analyzing unit performs the following steps:

(a) finding a first and a second tail region of the histogram;

(b) fitting the first and second tail regions to a predefined first model distribution and second model distribution, respectively and (c) estimating fitted parameters of the first model distribution and the second model distribution.

69. The apparatus of claim 68, wherein the finding step comprises the step of finding the first and second tail region based on a first derivative and second derivative method.

70. The apparatus of claim 68, wherein the model parameters comprise mean ($\mu$) and standard deviation ($\sigma$).

71. The apparatus of claim 70, wherein the deterministic component is calculated according the following formula: $\mu1-\mu2$, $\mu1$ representing the mean of the first model distribution, and $\mu2$ representing the mean of the second model distribution.

72. The apparatus of claim 70, wherein the random component is calculated according the following formula ($\sigma1+\sigma2$)/2,$\sigma1$ representing the standard deviation of the first model distribution, and $\sigma2$ representing the standard deviation of the second model distribution.

73. A method for analyzing a clock or communication signal comprised of at least one signal feature intended to exhibit an ideal characteristic, but which in fact exhibits a non-ideal characteristic, the method comprising:

receving the signal;

measuring a plurality of signal features within the received signal;

constructing a histogram based upon the plurality of measured features;

fitting a model distribution to a tail region of the histogram; the fitted model distribution providing information regarding deterministic and random jitter components within the signal.

74. An apparatus for analyzing a clock or communication signal comprised of at least one signal feature intended to exhibit an ideal characteristic, but which in fact exhibits a non-ideal characteristic, the apparatus comprising:.

a measurement apparatus for timing a plurality of rise or fail times within the received signal; and an analyzing unit for executing the method of claim 73.

* * * * *

UNITED STATES PATENT AND TRADEMARK OFFICE
CERTIFICATE OF CORRECTION

PATENT NO. : 6,799,144 B2
DATED : September 28, 2004
INVENTOR(S) : Li et al.

It is certified that error appears in the above-identified patent and that said Letters Patent is hereby corrected as shown below:

Column 5,
Line 41, "claim 2, the" should read -- claim 2, wherein the --
Line 43, "4, (wherein the" should read -- 4, wherein the --
Lines 44-45, "according the following formula: "$\mu 1 - \mu 2, \mu 1$" should read -- according to the following formula: $\mu 1 - \mu 2, \mu 1$ --
Line 49, "according the following formula: (σ1+σ2)2, σ1," should read -- according to the following formula: (σ1 + σ2)/2, σ1 --
Line 60, "the plutality of" should read -- the plurality of --

Column 6,
Line 14, "according the following formuila:" should read -- according to the following formula: --
Lines 19-20, "according the following formula (σ1 + σ2)/2, $\mu 1$" should read -- according to the following formula: (σ1 + σ2)/2, σ1 --
Line 25, "which in tact" should read -- which in fact --
Line 38, the words "(a) finding" should start a new paragraph
Line 43, "respectively, and" should read -- respectively; and --
Line 52, "according the" should read -- according to the --
Line 57, "according the following formula" should read -- according to the following formula: --

Column 7,
Lines 23 and 61, "according the" should read -- according to the --
Lines 28 and 66, "according the following formula" should read --according to the following formula: --

Column 8,
Line 31, "according the following formula;" should read -- according to the following formula: --
Line 36, "according the following formula" should read -- according to the following formula: --
Line 52, "of claim wherein" should read -- of claim 37, wherein --
Line 67, "according the" should read -- according to the --

Column 9,
Lines 5 and 39, "according the following formula" should read -- according to the following formula: --
Line 17, "histogram the fitted" should read -- histogram, the fitted --
Line 30, "and second. derivative" should read -- and second derivative --
Line 34, "according the" should read -- according to the --

UNITED STATES PATENT AND TRADEMARK OFFICE
CERTIFICATE OF CORRECTION

PATENT NO. : 6,799,144 B2
DATED : September 28, 2004
INVENTOR(S) : Li et al.

It is certified that error appears in the above-identified patent and that said Letters Patent is hereby corrected as shown below:

Column 10,
Lines 4-5, "according the following formula: $\mu1$-$\mu2$, $\mu1$representing" should read -- according to the following formula: $\mu1$-$\mu2$, $\mu1$ representing --
Lines 9 and 44, "according the following formula" should read -- according to the following formula: --
Line 39, "according the" should read -- according to the --

Column 11,
Line 9, "according the" should read -- according to the --
Line 14, "according the following formula" should read -- according to the following formula: --
Line 37, "respectively and" should read -- respectively; and --

Column 12,
Line 7, "according the" should read -- according to the --
Lines 12-13, "according the following formula ($\sigma1$ + $\sigma2$)/2,$\sigma1$" should read -- according to the following formula: ($\sigma1$ + $\sigma2$)/2, $\sigma1$ --
Lines 27-28, "of the histogram; the fitted" should read -- of the histogram, the fitted --
Line 36, "fail times" should read -- fall times --

Signed and Sealed this

Twenty-eighth Day of June, 2005

JON W. DUDAS
*Director of the United States Patent and Trademark Office*